(12) United States Patent
Turtinen et al.

(10) Patent No.: US 11,438,932 B2
(45) Date of Patent: Sep. 6, 2022

(54) CONTENTION RESOLUTION IN RANDOM ACCESS PROCEDURE

(71) Applicant: Nokia Technologies Oy, Espoo (FI)

(72) Inventors: Samuli Turtinen, Ii (FI); Chunli Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/859,901

(22) Filed: Apr. 27, 2020

(65) Prior Publication Data

US 2020/0351949 A1    Nov. 5, 2020

(30) Foreign Application Priority Data

May 2, 2019   (WO) ................ PCT/CN2019/085416

(51) Int. Cl.
*H04W 74/08* (2009.01)
*H04W 74/00* (2009.01)
*H04W 76/11* (2018.01)

(52) U.S. Cl.
CPC ..... *H04W 74/0833* (2013.01); *H04W 74/006* (2013.01); *H04W 74/0891* (2013.01); *H04W 76/11* (2018.02)

(58) Field of Classification Search
CPC ........... H04W 74/0833; H04W 74/006; H04W 74/0891; H04W 76/11; H04W 74/004
See application file for complete search history.

(56) References Cited

U.S. PATENT DOCUMENTS

| 9,066,290 | B2 | 6/2015 | Park et al. |
| 9,572,121 | B2 | 2/2017 | Nguyen et al. |
| 10,314,081 | B2 | 6/2019 | Chun et al. |
| 11,147,117 | B2 | 10/2021 | Charbit et al. |
| 2014/0079032 | A1 | 3/2014 | Bergstrom et al. |
| 2018/0027595 | A1 | 1/2018 | Wang et al. |

(Continued)

FOREIGN PATENT DOCUMENTS

| CN | 107360628 A | 11/2017 |
| CN | 108282899 A | 7/2018 |

(Continued)

OTHER PUBLICATIONS

Office Action for Taiwan Application No. 109114619 dated Mar. 23, 2021, 21 pages.

(Continued)

*Primary Examiner* — Thai Nguyen
(74) *Attorney, Agent, or Firm* — Alston & Bird LLP

(57) ABSTRACT

Embodiments of the present disclosure relate to contention resolution in random access procedure. An apparatus transmits a random access request to a further apparatus, and the random access request comprises a random access preamble and an identifier of the apparatus for a random access procedure. The apparatus then receives, from the further apparatus, control information on a control channel addressed to the identifier, and the control information indicates at least one of a resource and timing information for communication between the apparatus and the further apparatus. Next, the apparatus determines a result of the random access procedure based at least in part on the control information.

21 Claims, 6 Drawing Sheets

(56) References Cited

U.S. PATENT DOCUMENTS

| | | | |
|---|---|---|---|
| 2018/0146498 A1 | 5/2018 | Sahlin et al. | |
| 2019/0090107 A1 | 3/2019 | Kim et al. | |
| 2020/0107372 A1* | 4/2020 | Agiwal | H04W 72/14 |
| 2020/0112995 A1 | 4/2020 | Islam et al. | |
| 2020/0146069 A1* | 5/2020 | Chen | H04B 17/318 |
| 2020/0404712 A1* | 12/2020 | Christoffersson | H04W 74/0833 |
| 2021/0195676 A1* | 6/2021 | Wang | H04W 72/1268 |
| 2022/0053570 A1 | 2/2022 | You et al. | |

FOREIGN PATENT DOCUMENTS

| | | |
|---|---|---|
| CN | 111385909 A | 7/2020 |
| CN | 111526597 A | 8/2020 |
| EP | 3927094 A1 | 12/2021 |
| EP | 3930414 A1 | 12/2021 |
| IN | 2011KN02962 A | 2/2012 |
| WO | WO 2010/079941 A1 | 7/2010 |
| WO | WO 2020/146459 A1 | 7/2020 |
| WO | WO 2020/149660 A1 | 7/2020 |
| WO | WO 2020/163184 A1 | 8/2020 |
| WO | WO 2020/164466 A1 | 8/2020 |
| WO | WO 2020/168103 A1 | 8/2020 |
| WO | WO 2020/200117 A1 | 10/2020 |
| WO | WO 2020/221248 A1 | 11/2020 |

OTHER PUBLICATIONS

Office Action for Bangladesh Application No. 149/2020 dated Jun. 16, 2021, 1 page.
"Revised SID on NR-based Access to Unlicensed Spectrum", 3GPP TSG RAN Meeting #80, RP-181339, Agenda: 9.4.3, Qualcomm Incorporated, Jun. 11-14, 2018, 5 pages.
"Revision of Study on 5G Non-orthogonal Multiple Access", 3GPP TSG RAN Meeting #80, RP-181403, Agenda: 9.4.4, ZTE, Jun. 11-14, 2018, 5 pages.
"New Work Item: 2-step RACH for NR", 3GPP TSG RAN Meeting #82, RP-182894, Agenda: 9.1.1, ZTE Corporation, Dec. 10-13, 2018, 5 pages.
"3rd Generation Partnership Project; Technical Specification Group Radio Access Network; Study on NR-based access to unlicensed spectrum (Release 16)", 3GPP TR 38.889, V16.0.0, Dec. 2018, pp. 1-119.
"3rd Generation Partnership Project; Technical Specification Group Radio Access Network; NR; Medium Access Control (MAC) protocol specification (Release 15)", 3GPP TS 38.321, V15.5.0, Mar. 2019, pp. 1-78.
"3rd Generation Partnership Project; Technical Specification Group Radio Access Network; NR; Physical channels and modulation (Release 15)", 3GPP TS 38.211, V15.5.0, Mar. 2019, pp. 1-96.
International Search Report and Written Opinion received for corresponding Patent Cooperation Treaty Application No. PCT/CN2019/085416, dated Jan. 23, 2020, 9 pages.
Notice of Acceptance for Bangladesh Application No. 149/2020/301 dated Jan. 26, 2022, 1 page.
Notice of Acceptance for Bangladesh Application No. 364/2021/300 dated Jan. 26, 2022, 1 page.
Notice of Allowance for Taiwanese Application No. 109114619 dated Dec. 29, 2021, 3 pages.
OPPO, "3-steps RACH procedure for NR-U", 3GPP TSG-RAN WG2 Meeting #104, R2-1816262, (Nov. 12-16, 2018), 3 pages.
OPPO, "2-steps RACH procedure for NR-U", 3GPP TSG-RAN WG2 Meeting #104, R2-1816263, (Nov. 12-16, 2018), 4 pages.
Huawei et al., "consideration on 2-step RACH parameters and grant", 3GPP TSG-RAN WG2 Meeting #104, R2-1816605, (Nov. 12-16, 2018), 3 pages.
Huawei et al., "Consideration on grant size for 2-step RACH", 3GPP TSG-RAN WG2 Meeting #104, R2-1816607, (Nov. 12-16, 2018), 3 pages.
Huawei et al., "Two-step RACH procedure for NR-U", 3GPP TSG-RAN WG2 Meeting #104, R2-1816617, (Nov. 12-16, 2018), 4 pages.
MediaTek Inc., "2-step RACH msgB addressing and HARQ", 3GPP TSG-RAN WG2 Meeting #104, R2-1816687, (Nov. 12-16, 2018), 5 pages.
Intel Corporation, "Further consideration of 2-step CBRA", 3GPP TSG-RAN WG2 Meeting #104, R2-1816697, (Nov. 12-16, 2018), 6 pages.
Ericsson, "Release and Redirect in 2-Step Procedure", Change Request 38.304 CR 0056, Rev 2, 3GPP TSG-RAN WG2 Meeting #104, R2-1817200, (Nov. 12-16, 2018), 2 pages.
LG Electronics Inc., "2-Step RACH procedure for NR-U", 3GPP TSG-RAN WG2 #103bis, R2-1818098, (Nov. 12-16, 2018), 4 pages.
Institute for Information Industry (III), "Considerations on Common 2-Step RACH", 3GPP TSG-RAN WG2 Meeting #104, R2-1818162, (Nov. 12-16, 2018), 4 pages.
Vivo, "RAN2 impacts of 2-step RACH", 3GPP TSG-RAN WG2 Meeting #104, R2-1818260, (Nov. 12-16, 2018), 5 pages.
Qualcomm Incorporated et al., "TP for 2-step RACH in NR-U", 3GPP TSG-RAN2 #104, R2-1818504, (Nov. 12-16, 2018), 2 pages.
Vivo, "2-step RACH in mobility enhancement", 3GPP TSG-RAN WG2 Meeting #105, R2-1900501, (Feb. 25-Mar. 1, 2019), 2 pages.
Huawei, "Comparison of CHO and two-step handover", 3GPP TSG-RAN WG2 Meeting #105, R2-1900963, (Feb. 25-Mar. 1, 2019), 4 pages.
Nomor Research GmbH, "2-Step RACH Procedure for NTN", 3GPP TSG RAN WG2 Meeting #105, R2-1901474, (Feb. 25-Mar. 1, 2019), 3 pages.
Ericsson, "2-step Random Access for NR-U", 3GPP TSG-RAN WG2 #105, R2-1901752, (Feb. 25-Mar. 1, 2019), 3 pages.
CMCC, "Discussion of Contention-based 2-step RACH procedure", 3GPP TSG-RAN WG2 Meeting #105, R2-1901972, (Feb. 25-Mar. 1, 2019), 3 pages.
Vivo, "Clarification on the contention-based 2-step RACH", 3GPP TSG-RAN WG2 Meeting #105bis, R2-1903074, (Apr. 8-12, 2019), 3 pages.
Vivo, "Considerations on the 2-step RACH procedure", 3GPP TSG-RAN WG2 Meeting #105bis, R2-1903077, (Apr. 8-12, 2019), 7 pages.
Samsung, "2 Step RA: MsgA Aspects", 3GPP TSG-RAN2 105bis, R2-1903112, (Apr. 8-12, 2019), 5 pages.
Samsung, "2 Step RA: MsgB Aspects", 3GPP TSG-RAN2 105bis, R2-1903113, (Apr. 8-12, 2019), 4 pages.
Samsung, "2 Step RA: MAC PDU Format for MsgB", 3GPP TSG-RAN2 105bis, R2-1903115, (Apr. 8-12, 2019), 3 pages.
CATT, "Consideration on 2-step RACH", 3GPP TSG-RAN2 Meeting #105bis, R2-1903152, (Apr. 8-12, 2019), 6 pages.
ETRI, "Procedures for 2-step RACH", 3GPP TSG-RAN WG2 Meeting #105bis, R2-1903246, (Apr. 8-12, 2019), 2 pages.
OPPO, "Clarification on contention based 2-step RACH", 3GPP TSG-RAN WG2 Meeting #105bis, R2-1903291, (Apr. 6-12, 2019), 3 pages.
OPPO, "Contents for msgA and msgB", 3GPP TSG-RAN WG2 Meeting #105bis, R2-1903292, (Apr. 6-12, 2019), 6 pages.
OPPO, "Contention resolution for 2-step RACH", 3GPP TSG-RAN WG2 Meeting #105bis, R2-1903293, (Apr. 6-12, 2019), 5 pages.
Ericsson, "2-step RACH General Aspects", 3GPP TSG-RAN WG2 #105bis, R2-1903426, (Apr. 8-12, 2019), 6 pages.
Ericsson, "RNTIs and Contention Resolution for 2-step RA", 3GPP TSG-RAN WG2 #105bis, R2-1903429, (Apr. 8-12, 2019), 5 pages.
ZTE Corporation et al., "General consideration on the content of MsgB", 3GPP TSG-WG2 Meeting #105-bis, R2-1903548, (Apr. 8-12, 2019), 9 pages.
ZTE Corporation et al., "Consideration on 2-step RACH procedure", 3GPP TSG-WG2 Meeting #105-bis, R2-1903549, (Apr. 8-12, 2019), 11 pages.
Nokia et al., "Fall back procedure from 2-step RACH to 4-step RACH", 3GPP TSG-RAN WG2 Meeting #105bis, R2-1903715, (Apr. 8-12, 2019), 2 pages.
Nokia et al., "MsgB design", 3GPP TSG-RAN WG2 Meeting #105bis, R2-1903716, (Apr. 8-12, 2019), 3 pages.

(56) References Cited

OTHER PUBLICATIONS

Nokia et al., "Network control of 2-step CBRA procedure", 3GPP TSG-RAN WG2 Meeting #105bis, R2-1903717, (Apr. 8-12, 2019), 3 pages.

LG Electronics Inc., "Contention-based 2-Step RACH procedure", 3GPP TSG-RAN WG2 Meeting #105bis, R2-1903729, (Apr. 8-12, 2019), 5 pages.

Fujitsu, "Commonality of MsgB for RAR", 3GPP TSG-RAN WG2 Meeting #105bis, R2-1903781, (Apr. 8-12, 2019), 2 pages.

Fujitsu, "On recognition of msgB or msg2", 3GPP TSG-RAN WG2 Meeting #105bis, R2-1903783, (Apr. 8-12, 2019), 3 pages.

Spreadtrum Communications, "Discussion on 2-step RACH procedure", 3GPP TSG-RAN WG2 Meeting #105bis, R2-1903794, (Apr. 8-12, 2019), 3 pages.

Panasonic, "Discussion on 2-step RACH procedure", 3GPP TSG RAN WG2 #105bis, R2-1903914, (Apr. 8-12, 2019), 5 pages.

Huawei et al., "Discussion on the 2-step RACH procedure", 3GPP TSG-RAN WG2 #105bis, R2-1904110, (Apr. 8-12, 2019), 5 pages.

Huawei et al., "Discussion on msgB for 2-step RACH", 3GPP TSG-RAN WG2 Meeting #105bis, R2-1904113, (Apr. 8-12, 2019), 4 pages.

CMCC, "Discussion of MsgA and MsgB identification", 3GPP TSG-RAN WG2 Meeting #105bis, R2-1904325, (Apr. 8-12, 2019), 2 pages.

MediaTek Inc., "SI Request and BFR triggers for 2-step RACH", 3GPP TSG-RAN WG2 Meeting #105bis, R2-1904429, (Apr. 8-12, 2019), 3 pages.

Intel Corporation, "Procedure for two-step RACH", 3GPP TSG RAN WG2 #105bis, R2-1904439, (Apr. 8-12, 2019), 7 pages.

Qualcomm Incorporated, "two-step RACH msgB contents and RNTI for msgB", 3GPP TSG-RAN WG2 Meeting #105bis, R2-1904970, (Apr. 8-12, 2019), 3 pages.

NTT Docomo, Inc., "Initial consideration on 2 step RACH", 3GPP TSG-RAN WG2 Meeting #105bis, R2-1905118, (Apr. 8-12, 2019), 5 pages.

Nokia et al., "Contention resolution for CONNECTED mode UE", 3GPP TSG-RAN WG2 Meeting #106, R2-1907070, (May 13-17, 2019), 3 pages.

Office Action for Vietnamese Application No. 1-2021-07223 dated Jun. 16, 2022, 2 pages.

\* cited by examiner

CONTENTION RESOLUTION IN RANDOM ACCESS PROCEDURE

CROSS-REFERENCE TO RELATED APPLICATIONS

The present application claims priority to, and the benefit of, International Patent Application Number PCT/CN2019/085416, filed May 2, 2019, and entitled "Contention Resolution in Random Access Procedure."

FIELD

Embodiments of the present disclosure generally relate to the field of telecommunication and in particular, to apparatuses, methods and computer readable storage media for contention resolution in random access procedure.

BACKGROUND

Various wireless cellular communication systems have been implemented and are being implemented. Mobile communication systems have been developed and are being developed to meet the increasing demand for communication services. With the rapid advance of technologies, the mobile communication systems have evolved to the level capable of providing high speed data communication service beyond the early voice-oriented services.

A random access (RA) procedure refers to a procedure for a terminal device to establish or reestablish a connection with a network device such as an Evolved NodeB (eNB) or a 5G gNodeB (gNB). A contention based random access procedure can facilitate the possibility that multiple communication devices may be interested in attempting to access the network device through the RA procedure at the same or similar point in time. Once access has been established and/or confirmed, the network device can assign resources to a particular terminal device in support of the uplink communication with the network device.

SUMMARY

In general, example embodiments of the present disclosure provide a solution for contention resolution in random access procedure.

In a first aspect, there is provided an apparatus. The apparatus comprises at least one processor; and at least one memory including computer program codes; the at least one memory and the computer program codes are configured to, with the at least one processor, cause the apparatus to transmit a random access request to a second apparatus, the random access request comprising a random access preamble and an identifier of the apparatus for a random access procedure; receive, from the second apparatus, control information on a control channel addressed to the identifier, the control information indicating at least one of a resource and timing information for communication between the apparatus and the second apparatus; and determine a result of the random access procedure based at least in part on the control information.

In a second aspect, there is provided an apparatus. The apparatus comprises at least one processor; and at least one memory including computer program codes; the at least one memory and the computer program codes are configured to, with the at least one processor, cause the apparatus to receive from a second apparatus a random access request, the random access request comprising a random access preamble and an identifier of the second apparatus for a random access procedure; in response to the random access request, determine control information indicating at least one of a resource and timing information for communication between the apparatus and the second apparatus; and transmit, to the second apparatus, the control information on a control channel addressed to the identifier.

In a third aspect, there is provided a method. The method comprises transmitting, at an apparatus, a random access request to a second apparatus, the random access request comprising a random access preamble and an identifier of the apparatus for a random access procedure; receiving, from the second apparatus, control information on a control channel addressed to the identifier, the control information indicating at least one of a resource and timing information for communication between the apparatus and the second apparatus; and determining a result of the random access procedure based at least in part on the control information.

In a fourth aspect, there is provided a method. The method comprises receiving, at an apparatus, from a second apparatus a random access request, the random access request comprising a random access preamble and an identifier of the second apparatus for a random access procedure; in response to the random access request, determining control information indicating at least one of a resource and timing information for communication between the apparatus and the second apparatus; and transmitting, to the second apparatus, the control information on a control channel addressed to the identifier.

In a fifth aspect, there is provided an apparatus. The apparatus comprises means for transmitting, at the apparatus, a random access request to a second apparatus, the random access request comprising a random access preamble and an identifier of the apparatus for a random access procedure; means for receiving, from the second apparatus, control information on a control channel addressed to the identifier, the control information indicating at least one of a resource and timing information for communication between the apparatus and the second apparatus; and means for determining a result of the random access procedure based at least in part on the control information.

In a sixth aspect, there is provided an apparatus. The apparatus comprises means for receiving, at the apparatus, from a second apparatus a random access request, the random access request comprising a random access preamble and an identifier of the second apparatus for a random access procedure; means for in response to the random access request, determining control information indicating at least one of a resource and timing information for communication between the apparatus and the second apparatus; and means for transmitting, to the second apparatus, the control information on a control channel addressed to the identifier.

In a seventh aspect, there is provided a non-transitory computer readable medium comprising program instructions for causing an apparatus to perform at least the method according to the third aspect.

In an eighth aspect, there is provided a non-transitory computer readable medium comprising program instructions for causing an apparatus to perform at least the method according to the fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
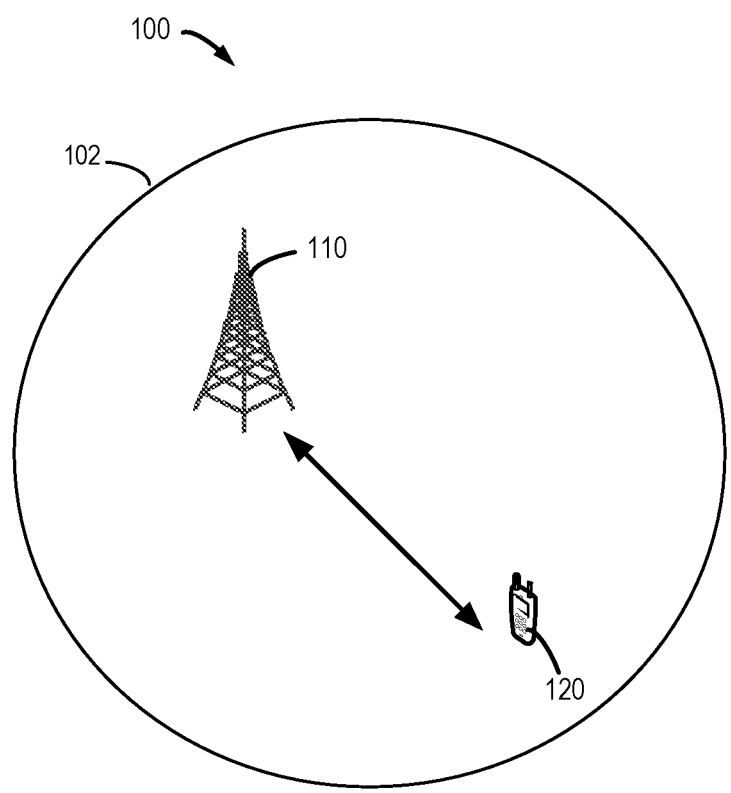
FIG. 1 illustrates an example communication network in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, an apparatus may comprise a terminal device, a network device or any other suitable device. As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

FIG. 1 illustrates an example communication system 100 in which example embodiments of the present disclosure may be implemented. The system 100 includes two apparatuses, a network device 110 and a terminal device 120 served by the network device 110. The serving area of the network device 110 is called as a cell 102. It is to be understood that the number of apparatuses (both the network devices and the terminal devices) is only for the purpose of illustration without suggesting any limitations. The system 100 may include any suitable number of network devices and terminal devices adapted for implementing embodiments of the present disclosure. Although not shown, it would be appreciated that one or more terminal devices may be located in the cell 102 and served by the network device 110.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Cyclic Prefix Orthogonal Frequency Division Multiplexing (CP-OFDM), Discrete Fourier Transform spread OFDM (DFT-s-OFDM) and/or any other technologies currently known or to be developed in the future.

In the communication system 100, upon a connection is established, the network device 110 can communicate with the terminal device 120 and the terminal device 120 can also communicate data and control information to the network device 110. A link from the network device 110 to the terminal device 120 is referred to as a downlink (DL), while a link from the terminal device 120 to the network device 110 is referred to as an uplink (UL). In DL, the network device 110 is a transmitting (TX) device (or a transmitter) and the terminal device 120 is a receiving (RX) device (or a receiver). In UL, the terminal device 120 is a TX device (or a transmitter) and the network device 110 is a RX device (or a receiver).

Typically, in order to communicate with the network device 110, the terminal device 120 may initiate a RA procedure to establish or reestablish a connection with the network device 110.

Figure 2A:
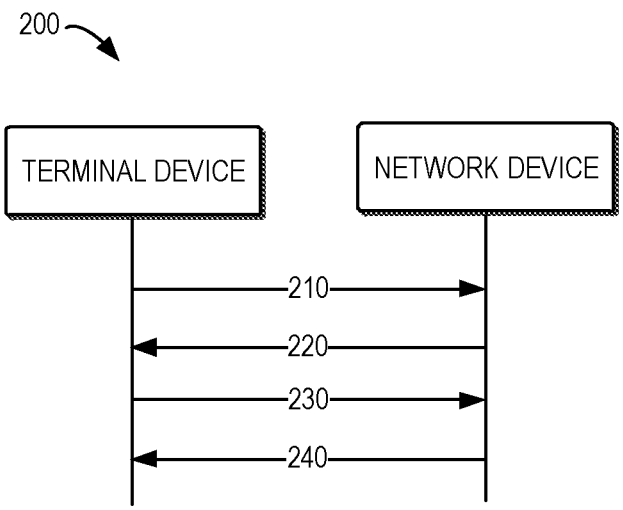
FIG. 2A and FIG. 2B illustrate flowcharts illustrating example random access procedures.

There are a plurality of possible RA procedures that can be employed, such as, a two-step RA, a four-step RA, and etc. The RA procedures may be based on contention among multiple terminal devices. A four-step contention-based RA procedure is a typical one, which is briefly introduced below with reference to FIG. 2A. In a RA procedure 200 of FIG. 2A, a terminal device selects and transmits 210 a random access preamble (which may be referred to as "Msg1") to a network device. The network device then transmits 220 a random access response RAR (which may be referred to as "Msg2") to the random access preamble. Upon receipt of the random access response, the terminal device transmits 230 scheduled transmission (which may be referred to as "Msg3") to the network device. The network device transmits 240, depending on contention across its serving terminal devices, a contention resolution (which may be referred to as "Msg4") to the terminal device.

Figure 2B:
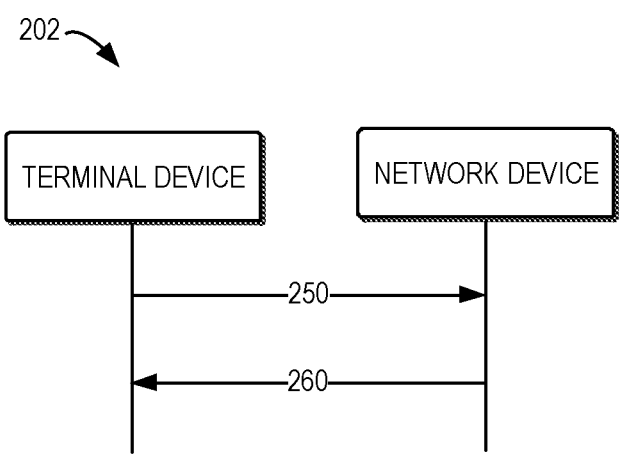

It has been agreed to employ a two-step procedure in order to achieve quick random access. An example of the two-step RA contention-based RA procedure is also briefly introduced below with reference to FIG. 2B. In a RA procedure 202 of FIG. 2B, a terminal device transmits 250 a first message (which may be referred to as "MsgA") to a network device. The first message combines a random access preamble (for example, Msg1) and uplink data (for example, Msg3). In response to the first message, the network device transmits 260 a second message (which may be referred to as "MsgB") to the terminal device. The second message combines a random access response (such as Msg2) and a contention resolution (such as Msg4).

Conventionally, for four-step RA procedure, the uplink timing alignment command (TAC) is provided via RAR scheduled on physical downlink control channel (PDCCH) addressed to RA-radio network temporary identifier (RNTI) for all the random access preamble transmissions. As the RAR is scheduled on PDCCH addressed to RA-RNTI, it enables to use a special type of Medium Access Control Protocol Data Unit (MAC PDU) solely defined for conveying RAR. Contention resolution is then provided over Msg4 in the four-step RA procedure. For a terminal device in CONNECTED mode, it is scheduled on PDCCH scrambled with cell-RNTI (C-RNTI) which serves as contention resolution either associated with UL grant (Contention Based Random Access/CBRA) or with UL grant/DL assignment (Contention Free Random Access/CFRA).

For two-step RA procedure, the first message (i.e. MsgA) is a signal to detect UE while the second message (i.e. MsgB) is for contention resolution for CBRA with a possible payload. The first message will at least include the equivalent information which is transmitted in Msg1/Msg3 for four-step RA procedure. As a baseline, all the triggers for four-step RA procedure are also applicable to two-step RA procedure; however further analysis is needed on how timing advance and grants can be obtained for the first message. The contention resolution in two-step RA procedure will be performed by including a UE identifier in the first message which is echoed in the second message.

For two-step RA procedure, it is envisioned that the MsgB for CONNECTED mode UE can be similarly to four-step RA scheduled on PDCCH addressed to UE's C-RNTI. Furthermore, as the CONNECTED mode UE will require also the value for UL timing alignment for some cases, it is envisioned that a new MAC CE is defined which may consist of 12 bits Timing Advance Command (TAC) indicating the absolute value for timing adjustment (unlike the current 6 bits TAC MAC CE which indicates relative adjustment to the current timing).

However, when the terminal device in the CONNECTED mode performs two-step RA procedure by sending the first message to the network device, it is not straightforward to consider the contention resolution to be successful by decoding of PDCCH addressed to C-RNTI, since the network device may be scheduling the terminal device normally (e.g., DL data) without knowing that the terminal device was performing RA procedure, for instance, after a scheduling request (SR) failure. Furthermore, the requirement for the RA procedure depends also on the scenario whether a Timing Alignment Timer (TAT) is running, i.e., whether TAC would be needed mandatorily for the terminal device or not. In contrast, in the four-step procedure, the terminal device will always receive TAC from RAR/Msg2.

According to some example embodiments of the present disclosure, there is proposed a solution for contention resolution in RA procedure. The solution is related to the RA procedure where a random access preamble and an identifier of the terminal device are transmitted together in a RA message, such as MsgA. One example of such RA procedure is a two-step RA procedure. It would be appreciated that any other suitable RA procedures may also be applicable. According to the solution, an apparatus transmits a random access request to a further apparatus, and the random access request comprises a random access preamble and an identifier of the apparatus for a random access procedure. The apparatus then receives, from the further apparatus, control information on a control channel addressed to the identifier, and the control information indicates at least one of a resource and timing information for communication between the apparatus and the further apparatus. Next, the apparatus determines a result of the random access procedure based at least in part on the control information. In this way, the result of RA procedure and contention resolution can be correctly determined even if there is other scheduling from the network device which is not in response to the RA procedure.

Figure 3:
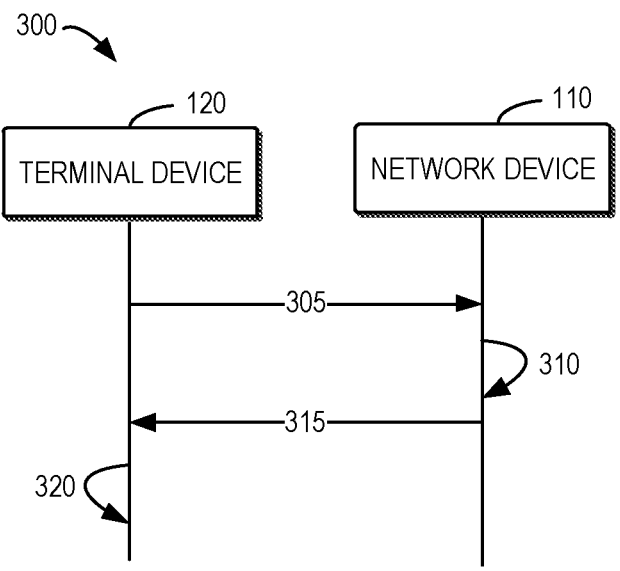
FIG. 3 illustrates a flowchart illustrating a process for contention resolution in RA procedure according to some example embodiments of the present disclosure.

Some example embodiments of the present disclosure will be described in detail below with reference to the accompanying drawings. Reference is now made to FIG. 3, which shows a process 300 for contention resolution in RA procedure according to an example embodiment of the present disclosure. For the purpose of discussion, the process 300 will be described with reference to FIG. 1. The process 300 may involve the terminal device 120 and the network device 110 as illustrated in FIG. 1. It is to be understood that although the process 300 is described as the terminal device 120 accessing the network device 110, the roles of the terminal device 120 and the network device 110 may be exchanged. It is also to be understood that the example embodiments described herein may be applied to two terminal devices, one of which is attempting to access to the other.

In the process 300, the terminal device 120 transmits 305 a random access request to the network device 110. The random access request comprises a random access preamble and an identifier of the terminal device 120 for a random access procedure. This random access procedure may be the two-step RA procedure described above and the random access request may be included in the first message, i.e. MsgA. Once the random access request is transmitted, the terminal device 120 may monitor PDCCH for contention resolution and start a timer for monitoring contention resolution from the network device 110. For purpose of discussion, this timer will be referred to as CR timer hereinafter.

In some example embodiments, the terminal device 120 may be in a connected state with the network device 110, that is, the terminal device 120 being in the CONNECTED mode. This means that the terminal device 120 has completed initial access to the network device 110. The identifier of the terminal device 120 may be for example a C-RNTI of the terminal device 120. In this case, the terminal device 120 may transmit the MsgA with the C-RNTI MAC CE to the network device 110.

The RA procedure may be triggered in any suitable manners. For example, the RA procedure may be initiated for beam failure recovery, by a PDCCH order or by the MAC sublayer or by the Radio Resource Control (RRC) sublayer.

The network device 110 receives the random access request from the terminal device 120. If the network device 110 determines that the contention based random access for the terminal device 120 is successful, the network device 110 determines 310 control information to be transmitted to notify the terminal device 120 of the successful random access. The control information may indicate at least one of a resource and timing information for communication between the network device 110 and the terminal device 120.

The control information may include a resource indication, for example, DL assignment or UL grant. Alternatively, or additionally, the control information may include for example a timing advance command (TAC) for indicating an amount of timing adjustment which is used for timing alignment with the terminal device 120 on uplink. The TAC may also be transmitted by using the resource indicated by the DL assignment. The determination of the control information by the network device 110 will be detailed below.

Then, the network device 110 transmit 315 the control information on a control channel addressed to the identifier of the terminal device 120. For example, the control information may be transmitted on PDCCH addressed to the C-RNTI of the terminal device 120. The network device 110 may further transmit other control information and data to the terminal device 120.

As such, the terminal device 120 may receive the control information by monitoring the control channel addressed to its identifier. For example, the terminal device 120 may receive the control information by monitoring the PDCCH addressed to its C-RNTI. Then, the terminal device 120 determines 320 a result of the RA procedure based at least in part on the control information.

Now detailed description is given from the perspective of the terminal device 120 about how to determine the result of the RA procedure. Timing advance for uplink transmission is essential. TAC as mentioned above is used to notify the terminal device 120 of relative or absolute timing advance value for timing adjustment. Meanwhile, a timer, which is referred to as timing alignment timer (TAT), may be maintained by the terminal device 120. The TAT is used to indicate whether the terminal device 120 is currently in timing alignment with the network device 110 on uplink. If the TAT is running, it means that the terminal device 120 is currently in timing alignment with the network device 110 on uplink. If the TAT is not running, it means that TAC is mandatorily needed for the terminal device 120. When the TAC is received from the network device 110, the TAT will be restarted or started.

In some example embodiments, the terminal device 120 may determine the result of the RA procedure based on the control information received on the control channel. The terminal device 120 may determine whether TAC is received from the network device 110 regardless of whether the TAT is running or not. The TAC may be received on a physical downlink shared channel (PDSCH), for example, TAC MAC CE, or on the PDCCH as a scheduling command.

In one example embodiment, the terminal device 120 may determine the result of the RA procedure based on a resource indication received on the control channel, for example, the PDCCH addressed to the C-RNTI of the terminal device 120. If the PDCCH transmission comprises a DL assignment, the terminal device 120 may determine whether a TAC is received by using the DL resource which is indicated by the DL assignment. If the TAC is received, the terminal device 120 may determine that the RA procedure and contention resolution is successful. Once the TAC is received, the terminal device 120 may further restart the TAT (when the TAT is running) or start the TAT (when the TAT is not running). Alternatively, when the TAT is running, the terminal device 120 may ignore the received TAC such that the TAT would not be restarted. Since the contention resolution is considered to be successful, the terminal device 120 may stop or cease the CR timer.

The TAC may be included in a data unit, for example a MAC protocol data unit (PDU). As an example, based on the DL assignment, the terminal device 120 may decode MAC PDU on the PDSCH. If the decoded MAC PDU comprises a TAC MAC CE with absolute timing value for timing adjustment, the terminal device 120 may determine that the RA procedure is successful. The terminal device 120 may also stop or cease the CR timer.

Figure 4:
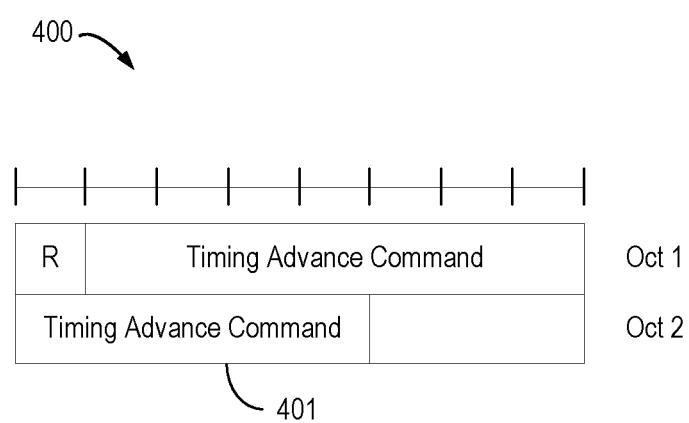
FIG. 4 illustrates a schematic diagram illustrating a TAC MAC CE according to some example embodiments of the present disclosure.

Referring to FIG. 4, FIG. 4 shows a schematic diagram 400 illustrating a TAC MAC CE 401 according to some example embodiments of the present disclosure. As shown in FIG. 4, the TAC MAC CE 401 occupies 12 bits, which means that the TAC MAC CE 401 indicates an absolute timing advance value for timing adjustment. It is to be understood that the TAC MAC CE shown in FIG. 4 is an example without any limitation.

In another example embodiment, the terminal device 120 may determine the result of the RA procedure based on timing information received on the PDCCH addressed to the C-RNTI of the terminal device 120. For example, if TAC is directly carried by the PDCCH as a scheduling command or a scheduling command carried by the PDCCH indicates the TAC, the terminal device 120 may determine that the RA procedure is successful.

In such embodiments, the result of RA procedure and contention resolution can be determined in a simple way, which is useful for the two-step RA procedure.

For the above embodiments where TAC is used by the terminal device 120 as a criterion, if there is a case where the TAC may be transmitted or indicated by the network device 110 without a RA procedure, the terminal device 120 may further determine whether the TAC is in response to the RA procedure. If the terminal device 120 determines that the TAC is in response to the RA procedure, then the terminal device 120 may determine that the RA procedure is successful.

As an example, the TAC MAC CE may include a command indication which indicates that the TAC MAC CE is transmitted in response to the RA procedure. Alternatively, such a command indication may not be included in the TAC MAC CE but be transmitted in association with the TAC MAC CE instead. In this way, a false determination on the result of RA procedure can be avoided.

In some example embodiments, the terminal device 120 may determine the result of the RA procedure based on a running state of the TAT maintained by the terminal device 120 and the control information on the control channel addressed to the identifier of the terminal device 120. The terminal device 120 may determine whether the TAT is running or not.

If the TAT is not running, which means that the TAC is mandatorily needed for the terminal device 120, reception of the TAC or another indication of timing advance may be used as a criterion for contention resolution. If the TAT is not running and the TAC is received, the terminal device 120 may determine that the RA procedure is successful. The TAC may be received on PDSCH in form of TAC MAC CE or be received on PDCCH as a scheduling command, as described above.

As an example, based on the DL assignment received on the PDCCH addressed to the C-RNTI of the terminal device 120, the terminal device 120 may decode MAC PDU on PDSCH. If the decoded MAC PDU comprises a TAC MAC CE with absolute timing value for timing adjustment, the terminal device 120 may determine that the RA procedure is successful. The terminal device 120 may also stop or cease the CR timer.

The ways for the terminal device 120 to receive or determine the TAC are similar with the above embodiments where the TAC is used as a criterion regardless of the running state of the TAT maintained by the terminal device 120. Therefore, details in this regard is not repeated here.

It is to be understood that if there is a case where the TAC may be transmitted or indicated by the network device 110 without a RA procedure, the terminal device 120 may further determine whether the TAC is in response to the RA procedure. If the terminal device 120 determines that the TAC is in response to the RA procedure, then the terminal device 120 may determine that the RA procedure is successful.

If the TAT is running, it means that the terminal device 120 is in timing alignment with the network device 110 on uplink and the TAC is not mandatorily needed for the terminal device 120. Therefore, if the TAT is running and the control information received on the control channel indicates an uplink resource, the terminal device 120 may determine that the RA procedure is successful. For example, in the case where the TAT is running, if the PDCCH received by the terminal device 120 comprises a UL grant, the terminal device 120 may determine that the RA procedure is successful.

It is to be understood that aspects described above with respect to different example embodiments can be combined. For example, in the case where the TAT is running, a determination of whether TAC is received or indicated may be used as a criterion for contention resolution in addition to the uplink resource indication (e.g., UL grant).

For the example embodiments where the TAC is used as a criterion for contention resolution, upon reception of the TAC, in particular TAC MAC CE, the TAT may be started or restarted. In some example embodiments, the TAC may also be ignored if the TAT is running.

Detailed description has been given on the side of the terminal device 120 about how to determine the result of the RA procedure. Now referring back to FIG. 3, after receiving the random access request, the network device 110 may determines 310 the control information to be transmitted to the terminal device 120 in a similar way.

A timer, which is similar to the TAT maintained by the terminal device 120, may be maintained by the network device 110. Such a timer is used to indicate whether the terminal device 120 is currently in timing alignment with the network device 110 on uplink. It is to be understood that the network device 110 may maintain a plurality of such timers for each of the terminal device in the serving cell 102.

In some example embodiments, the network device 110 may transmit a TAC to the terminal device 120 regardless of the running state of the timer for the terminal device 120. For example, the network device 110 may determine a TAC for the terminal device 120. The network device 110 may transmit TAC MAC CE on PDSCH and include DL assignment in the PDCCH addressed to the C-RNTI of the terminal device 120 such that the PDSCH can be detected and decoded by the terminal device 120. Alternatively, or additionally, the network device 110 may transmit the TAC on the PDCCH addressed to the C-RNTI of the terminal device 120 as a scheduling command, such that the terminal device 120 may receive the TAC directly on the PDCCH without decoding of a PDSCH.

In some example embodiments, the network device 110 may determine the control information to be transmitted to the terminal device 120 further based on the timer maintained for the terminal device 120. In the case where the timer for the terminal device 120 is not running, the network device 110 may determine a TAC for the terminal device 120 and transmit the TAC on PDCCH or PDSCH to the terminal device 120, as described above.

In the case where the timer for the terminal device 120 is running, the network device 110 may determine an uplink resource for the terminal device 120 and transmit an indication for the determined uplink resource. For example, the network device 110 may transmit a UL grant on the PDCCH addressed to the C-RNTI of the terminal device 120.

It is to be understood that aspects described above with respect to different example embodiments can be combined. For example, in the case where the timer for the terminal device 120 is running, the network device 110 may additionally determine a TAC for the terminal device 120 and transmit the determined TAC to the terminal device 120.

The above example embodiments are described in a scenario where the terminal device 120 expects to access to the network device 110. The embodiments of the present disclosure may be applied to scenario involving two terminal devices or two network devices with one expecting to access to the other.

More details of the example embodiments in accordance with the present disclosure will be described with reference to FIGS. 5-6.

Figure 5:
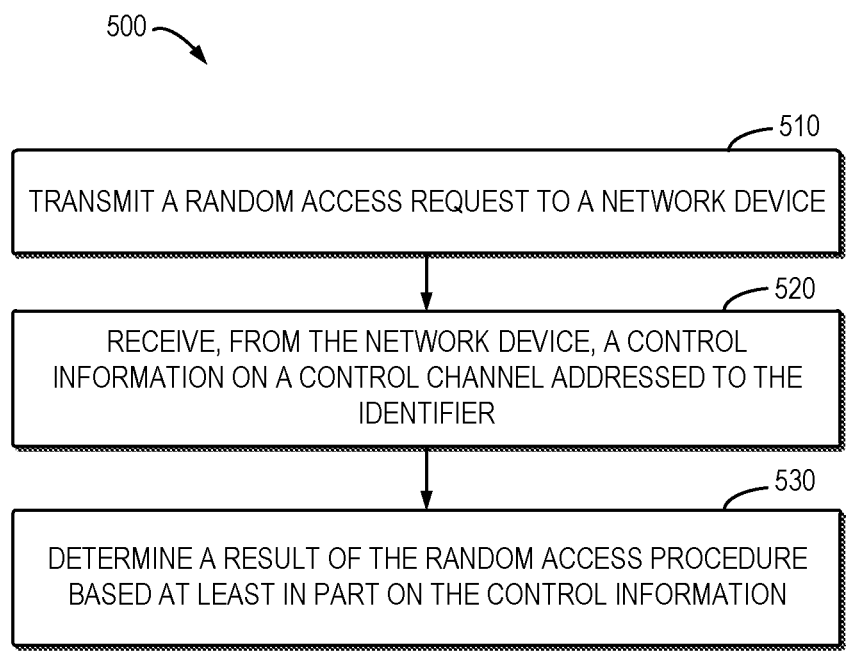
FIG. 5 illustrates a flowchart of a method according to some example embodiments of the present disclosure.

FIG. 5 shows a flowchart of an example method 500 according to some example embodiments of the present disclosure. The method 500 can be implemented at an apparatus e.g. at the terminal device 120 as shown in FIG. 1. For the purpose of discussion, the method 500 will be described with reference to FIG. 1.

At block 510, the terminal device 120 transmits a random access request to a network device 110, the random access request comprising a random access preamble and an identifier of the terminal device 120 for a random access procedure. At block 520, the terminal device 120 receive, from the network device 110, control information on a control channel addressed to the identifier, the control information indicating at least one of a resource and timing information for communication between the terminal device 120 and the network device 110. At block 530, the terminal device 120 determines a result of the random access procedure based at least in part on the control information.

In some example embodiments, determining the result of the random access procedure comprises: in response to the control information indicating a first resource for a first link from the network device 110 to the terminal device 120, determining whether a timing advance command for an amount of timing adjustment is received by using the first resource, the amount of timing adjustment being used for timing alignment with the network device 110 on a second link from the terminal device 120 to the network device 110; and in response to determining that the timing advance command is received, determining that the random access procedure is successful.

In some example embodiments, determining the result of the random access procedure comprises: in response to the control information indicating a timing advance command for an amount of timing adjustment, the amount of timing adjustment being used for timing alignment with the network device 110 on a second link from the terminal device 120 to the network device 110, determining that the random access procedure is successful.

In some example embodiments, determining that the random access procedure is successful comprises: determining whether the timing advance command is in response to the random access request; and in response to determining that the timing advance command is in response to the random access request, determining that the random access procedure is successful.

In some example embodiments, determining the result of the random access procedure comprises: determining the result of the random access procedure further based on a determination of whether a timer maintained by the terminal device 120 is running, the timer being configured to indicate whether the terminal device 120 is in timing alignment with the network device 110 on a second link from the terminal device 120 to the network device 110.

In some example embodiments, the determining the result of the random access procedure is further based on the determination that the timer is not running.

In some example embodiments, the method 500 further comprises: starting the timer in response to determining that the timing advance command is received.

In some example embodiments, determining the result of the random access procedure further based on the determination comprising: in response to determining that the timer is running and the control information indicating a second resource for the second link, determining that the random access procedure is successful.

In some example embodiments, the identifier of the terminal device 120 comprises a cell radio network temporary identifier of the terminal device 120.

In some example embodiments, the terminal device 120 is in a connected state with the network device 110.

Figure 6:
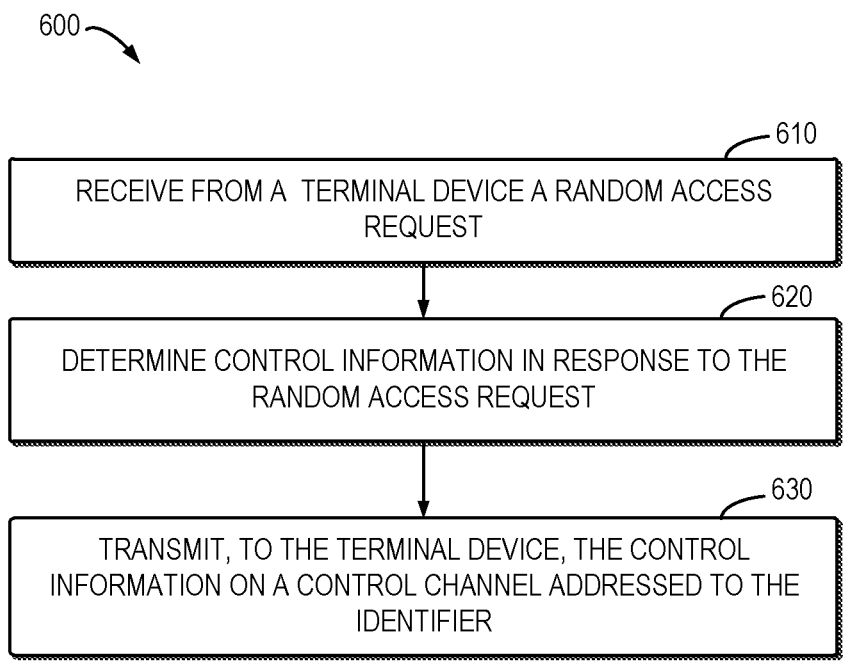
FIG. 6 illustrates a flowchart of a method according to some example embodiments of the present disclosure.

FIG. 6 shows a flowchart of an example method 600 according to some example embodiments of the present disclosure. The method 600 can be implemented at an apparatus. e.g. at the network device 110 as shown in FIG. 1. For the purpose of discussion, the method 600 will be described with reference to FIG. 1.

At block 610, the network device 110 receives from a terminal device 120 a random access request, the random access request comprising a random access preamble and an identifier of the terminal device 120 for a random access procedure. At block 620, in response to the random access request, the network device 110 determines control information indicating at least one of a resource and timing information for communication between the network device 110 and the terminal device 120. At block 630, the network device 110 transmits, to the terminal device 120, the control information on a control channel addressed to the identifier.

In some example embodiments, determining the control information comprising: determining a timing advance command for an amount of timing adjustment, the amount of timing adjustment being used for timing alignment with the terminal device 120 on a second link from the terminal device 120 to the network device 110; transmitting to the terminal device 120 the timing advance command by using a first resource for a first link from the network device 110 to the terminal device 120; and determining the control information based on the first resource.

In some example embodiments, determining the control information comprising: determining a timing advance command for an amount of timing adjustment, the amount of timing adjustment being used for timing alignment with the terminal device 120 on a second link from the terminal device 120 to the network device 110; and determining the control information based on the timing advance command.

In some example embodiments, the method 600 further comprises: indicating to the terminal device 120 that the timing advance command is in response to the random access request.

In some example embodiments, determining the control information comprising: determining the control information based on a determination of whether a timer maintained by the network device 110 is running, the timer being configured to indicate whether the network device 110 is in timing alignment with the terminal device 120 on a second link from the terminal device 120 to the network device 110.

In some example embodiments, the method 600 further comprises: determining the control information further based on the determination that the timer is not running.

In some example embodiments, the method 600 further comprises: starting the timer after transmitting the timing advance command.

In some example embodiments, determining the control information based on the determination further comprising: in response to determining that the timer is running, determining the control information to indicate a second resource for the second link.

In some example embodiments, the identifier of the terminal device 120 comprises a cell radio network temporary identifier of the terminal device 120.

In some example embodiments, the terminal device 120 is in a connected state with the network device 110.

In some example embodiments, an apparatus capable of performing the method 500 (for example, the terminal device 120) may comprise means for performing the respective steps of the method 500. The means may be implemented in any suitable form. For example, the means may be implemented in a circuitry or software module.

In some example embodiments, the apparatus comprises: means for transmitting, at the apparatus, a random access request to a second apparatus, the random access request comprising a random access preamble and an identifier of the apparatus for a random access procedure; means for receiving, from the second apparatus, control information on a control channel addressed to the identifier, the control information indicating at least one of a resource and timing information for communication between the apparatus and the second apparatus; and means for determining a result of the random access procedure based at least in part on the control information.

In some example embodiments, the means for determining the result of the random access procedure comprises: means for in response to the control information indicating a first resource for a first link from the second apparatus to the apparatus, determining whether a timing advance command for an amount of timing adjustment is received by using the first resource, the amount of timing adjustment being used for timing alignment with the second apparatus on a second link from the apparatus to the second apparatus; and means for in response to determining that the timing advance command is received, determining that the random access procedure is successful.

In some example embodiments, the means for determining the result of the random access procedure comprises: means for in response to the control information indicating a timing advance command for an amount of timing adjustment, the amount of timing adjustment being used for timing alignment with the second apparatus on a second link from the apparatus to the second apparatus, determining that the random access procedure is successful.

In some example embodiments, the means for determining that the random access procedure is successful comprises: means for determining whether the timing advance command is in response to the random access request; and means for in response to determining that the timing advance command is in response to the random access request, determining that the random access procedure is successful.

In some example embodiments, the means for determining the result of the random access procedure comprises: means for determining the result of the random access procedure further based on a determination of whether a timer maintained by the apparatus is running, the timer being configured to indicate whether the apparatus is in timing alignment with the second apparatus on a second link from the apparatus to the second apparatus.

In some example embodiments, the determining the result of the random access procedure is further based on the determination that the timer is not running.

In some example embodiments, the apparatus further comprises: means for starting the timer in response to determining that the timing advance command is received.

In some example embodiments, the means for determining the result of the random access procedure further based on the determination comprising: means for in response to determining that the timer is running and the control information indicating a second resource for the second link, determining that the random access procedure is successful.

In some example embodiments, the identifier of the apparatus comprises a cell radio network temporary identifier of the apparatus.

In some example embodiments, the apparatus is in a connected state with the second apparatus.

In some example embodiments, the apparatus comprises a terminal device and the second apparatus comprises a network device.

In some example embodiments, an apparatus capable of performing the method 600 (for example, the network device 110) may comprise means for performing the respective steps of the method 600. The means may be implemented in any suitable form. For example, the means may be implemented in a circuitry or software module.

In some example embodiments, the apparatus comprises: means for receiving, at the apparatus, from a second apparatus a random access request, the random access request comprising a random access preamble and an identifier of the second apparatus for a random access procedure; means for in response to the random access request, determining control information indicating at least one of a resource and timing information for communication between the apparatus and the second apparatus; and means for transmitting, to the second apparatus, the control information on a control channel addressed to the identifier.

In some example embodiments, the means for determining the result of the random access procedure comprises: means for in response to the control information indicating a first resource for a first link from the second apparatus to the apparatus, determining whether a timing advance command for an amount of timing adjustment is received by using the first resource, the amount of timing adjustment being used for timing alignment with the second apparatus on a second link from the apparatus to the second apparatus; and means for in response to determining that the timing advance command is received, determining that the random access procedure is successful.

In some example embodiments, the means for determining the result of the random access procedure comprises: means for in response to the control information indicating a timing advance command for an amount of timing adjustment, the amount of timing adjustment being used for timing alignment with the second apparatus on a second link from the apparatus to the second apparatus, determining that the random access procedure is successful.

In some example embodiments, the means for determining that the random access procedure is successful comprises: means for determining whether the timing advance command is in response to the random access request; and means for in response to determining that the timing advance command is in response to the random access request, determining that the random access procedure is successful.

In some example embodiments, the means for determining the result of the random access procedure comprises: means for determining the result of the random access procedure further based on a determination of whether a timer maintained by the apparatus is running, the timer being configured to indicate whether the apparatus is in timing alignment with the second apparatus on a second link from the apparatus to the second apparatus.

In some example embodiments, the determining the result of the random access procedure is further based on the determination that the timer is not running.

In some example embodiments, further comprising: means for starting the timer in response to determining that the timing advance command is received.

In some example embodiments, the means for determining the result of the random access procedure further based on the determination comprising: means for in response to determining that the timer is running and the control information indicating a second resource for the second link, determining that the random access procedure is successful.

In some example embodiments, the identifier of the apparatus comprises a cell radio network temporary identifier of the apparatus.

In some example embodiments, the apparatus is in a connected state with the second apparatus.

In some example embodiments, the apparatus comprises a terminal device and the second apparatus comprises a network device.

Figure 7:
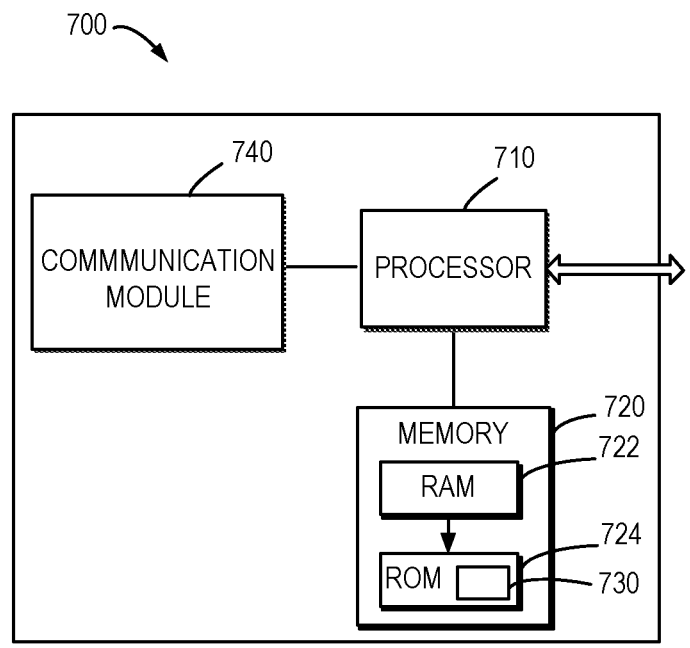
FIG. 7 illustrates a simplified block diagram of a device that is suitable for implementing embodiments of the present disclosure.

FIG. 7 is a simplified block diagram of a device 700 that is suitable for implementing embodiments of the present disclosure. The device 700 may be provided to implement the communication device, for example the terminal device 120 or the network device 110 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 720. The processor 710 may perform any suitable actions and processing by loading the program 730 into the RAM 720.

The embodiments of the present disclosure may be implemented by means of the program 730 so that the device 700 may perform any process of the disclosure as discussed with reference to FIGS. 5 to 6. The embodiments of the present disclosure may also be implemented by hardware or by a combination of software and hardware.

Figure 8:
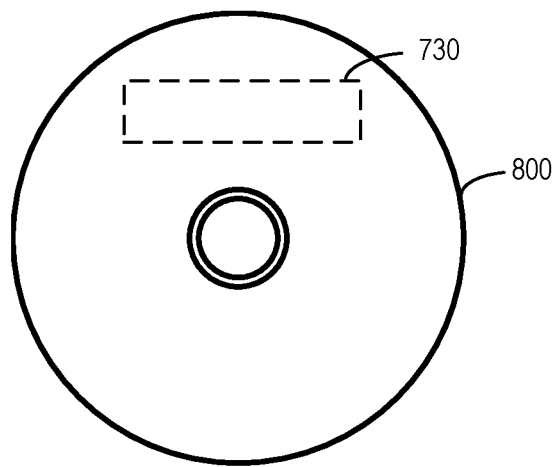
FIG. 8 illustrates a block diagram of an example computer readable medium in accordance with some embodiments of the present disclosure.

In some embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 500 or 600 as described above with reference to FIGS. 5-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus, comprising:
   at least one processor; and
   at least one memory including computer program codes;
   the at least one memory and the computer program codes are configured to, with the at least one processor, cause the apparatus at least to:
      transmit a random access request to a second apparatus, the random access request comprising a random access preamble and an identifier of the apparatus for a random access procedure;
      receive, from the second apparatus, control information on a control channel addressed to the identifier, the control information indicating at least one of a resource and timing information for communication between the apparatus and the second apparatus; and
      determine a result of the random access procedure based at least in part on the control information received from the second apparatus in response to the random access request and whether a timer maintained by the apparatus is running, the timer being configured to indicate whether the apparatus is in timing alignment with the second apparatus on a second link from the apparatus to the second apparatus.

2. The apparatus of claim 1, wherein when determining the result of the random access procedure, the at least one memory and the computer program codes are configured to, with the at least one processor, cause the apparatus to:
   in response to the control information indicating a first resource for a first link from the second apparatus to the apparatus, determine whether a timing advance command for an amount of timing adjustment is received by using the first resource, the amount of timing adjustment being used for timing alignment with the second apparatus on the second link from the apparatus to the second apparatus; and
   in response to determining that the timing advance command is received, determine that the random access procedure is successful.

3. The apparatus of claim 2, wherein when determining the result of the random access procedure, the at least one memory and the computer program codes are configured to, with the at least one processor, cause the apparatus to:

in response to determining that the timer is not running, determine that the random access procedure is successful.

4. The apparatus of claim 1, wherein when determining the result of the random access procedure, the at least one memory and the computer program codes are configured to, with the at least one processor, cause the apparatus to:
in response to determining that the timer is running and the control information indicating a second resource for the second link, determine that the random access procedure is successful.

5. The apparatus of claim 1, wherein the identifier of the apparatus comprises a cell radio network temporary identifier of the apparatus.

6. An apparatus, comprising:
at least one processor; and
at least one memory including computer program codes;
the at least one memory and the computer program codes are configured to, with the at least one processor, cause the apparatus at least to:
receive from a second apparatus a random access request, the random access request comprising a random access preamble and an identifier of the second apparatus for a random access procedure;
in response to the random access request, determine, based on whether a timer maintained by the apparatus is running, the timer being configured to indicate whether the apparatus is in timing alignment with the second apparatus on a second link from the second apparatus to the apparatus, control information indicating at least one of a resource and timing information for communication between the apparatus and the second apparatus; and
transmit, to the second apparatus, the control information on a control channel addressed to the identifier.

7. The apparatus of claim 6, wherein when determining the control information, the at least one memory and the computer program codes are configured to, with the at least one processor, cause the apparatus to:
determine a timing advance command for an amount of timing adjustment, the amount of timing adjustment being used for timing alignment with the second apparatus on the second link from the second apparatus to the apparatus;
transmit to the second apparatus the timing advance command by using a first resource for a first link from the apparatus to the second apparatus; and
determine the control information based on the first resource.

8. The apparatus of claim 7, wherein when determining the control information based on the first resource, the at least one memory and the computer program codes are configured to, with the at least one processor, cause the apparatus to:
in response to determining that the timer is not running, determine the control information to indicate a first resource for a first link from the apparatus to the second apparatus.

9. The apparatus of claim 6, wherein when determining the control information, the at least one memory and the computer program codes are configured to, with the at least one processor, cause the apparatus to:
in response to determining that the timer is running, determine the control information to indicate a second resource for the second link.

10. The apparatus of claim 6, wherein the identifier of the second apparatus comprises a cell radio network temporary identifier of the second apparatus.

11. A method, comprising:
transmitting, at an apparatus, a random access request to a second apparatus, the random access request comprising a random access preamble and an identifier of the apparatus for a random access procedure;
receiving, from the second apparatus, control information on a control channel addressed to the identifier, the control information indicating at least one of a resource and timing information for communication between the apparatus and the second apparatus; and
determining a result of the random access procedure based at least in part on the control information received from the second apparatus in response to the random access request and whether a timer maintained by the apparatus is running, the timer being configured to indicate whether the apparatus is in timing alignment with the second apparatus on a second link from the apparatus to the second apparatus.

12. The method of claim 11, wherein determining the result of the random access procedure comprises:
in response to the control information indicating a first resource for a first link from the second apparatus to the apparatus, determining whether a timing advance command for an amount of timing adjustment is received by using the first resource, the amount of timing adjustment being used for timing alignment with the second apparatus on the second link from the apparatus to the second apparatus; and
in response to determining that the timing advance command is received, determining that the random access procedure is successful.

13. The method of claim 12, wherein determining the result of the random access procedure comprises:
in response to determining that the timer is not running, determining that the random access procedure is successful.

14. The method of claim 11, wherein determining the result of the random access procedure comprising:
in response to determining that the timer is running and the control information indicating a second resource for the second link, determining that the random access procedure is successful.

15. The method of claim 11, wherein the identifier of the apparatus comprises a cell radio network temporary identifier of the apparatus.

16. A method, comprising:
receiving, at an apparatus, from a second apparatus, a random access request, the random access request comprising a random access preamble and an identifier of the second apparatus for a random access procedure;
in response to the random access request, determining, based on whether a timer maintained by the apparatus is running, the timer being configured to indicate whether the apparatus is in timing alignment with the second apparatus on a second link from the second apparatus to the apparatus, control information indicating at least one of a resource and timing information for communication between the apparatus and the second apparatus; and
transmitting, to the second apparatus, the control information on a control channel addressed to the identifier.

17. The method of claim 16, wherein determining the control information comprising:

determining a timing advance command for an amount of timing adjustment, the amount of timing adjustment being used for timing alignment with the second apparatus on the second link from the second apparatus to the apparatus;

transmitting to the second apparatus the timing advance command by using a first resource for a first link from the apparatus to the second apparatus; and determining the control information based on the first resource.

18. The method of claim 17, wherein determining the control information based on the first resource comprising:

in response to determining that the timer is not running, determining the control information to indicate a first resource for a first link from the apparatus to the second apparatus.

19. The method of claim 16, wherein determining the control information comprising:

in response to determining that the timer is running, determining the control information to indicate a second resource for the second link.

20. A non-transitory computer readable medium comprising program instructions which, when executed by an apparatus comprising a processor, cause the processor to perform:

transmitting, at the apparatus, a random access request to a second apparatus, the random access request comprising a random access preamble and an identifier of the apparatus for a random access procedure;

receiving, from the second apparatus, control information on a control channel addressed to the identifier, the control information indicating at least one of a resource and timing information for communication between the apparatus and the second apparatus; and determining a result of the random access procedure based at least in part on the control information received from the second apparatus in response to the random access request and whether a timer maintained by the apparatus is running, the timer being configured to indicate whether the apparatus is in timing alignment with the second apparatus on a second link from the apparatus to the second apparatus.

21. A non-transitory computer readable medium comprising program instructions which, when executed by an apparatus comprising a processor, cause the processor for causing an apparatus to perform:

receiving, at the apparatus, from a second apparatus, a random access request, the random access request comprising a random access preamble and an identifier of the second apparatus for a random access procedure;

in response to the random access request, determining, based on whether a timer maintained by the apparatus is running, the timer being configured to indicate whether the apparatus is in timing alignment with the second apparatus on a second link from the second apparatus to the apparatus, control information indicating at least one of a resource and timing information for communication between the apparatus and the second apparatus; and transmitting, to the second apparatus, the control information on a control channel addressed to the identifier.

* * * * *

UNITED STATES PATENT AND TRADEMARK OFFICE
CERTIFICATE OF CORRECTION

| | |
|---|---|
| PATENT NO. | : 11,438,932 B2 |
| APPLICATION NO. | : 16/859901 |
| DATED | : September 6, 2022 |
| INVENTOR(S) | : Samuli Turtinen et al. |

Page 1 of 1

It is certified that error appears in the above-identified patent and that said Letters Patent is hereby corrected as shown below:

In the Drawings

Sheet 6 of 6, FIG. 7, for reference numeral "740", Line 1, delete "COMMMUNICATION" and insert -- COMMUNICATION --, therefor.

In the Claims

In Column 22, Lines 14-15, Claim 21, delete "for causing an apparatus to perform:" and insert -- to perform: --, therefor.

Signed and Sealed this
Ninth Day of April, 2024

Katherine Kelly Vidal
*Director of the United States Patent and Trademark Office*